United States Patent [19]

Yoshida et al.

[11] Patent Number: 5,099,349
[45] Date of Patent: Mar. 24, 1992

[54] OPTICAL TRANSMISSION LINE SYSTEM

[75] Inventors: Hiroshi Yoshida, Kawasaki; Takashi Kihara, Zama, both of Japan

[73] Assignee: Fujitsu Limited, Kawasaki, Japan

[21] Appl. No.: 477,538

[22] Filed: Feb. 9, 1990

[30] Foreign Application Priority Data

Feb. 9, 1989 [JP] Japan .................... 1-030681

[51] Int. Cl.⁵ .................................. H04B 10/24
[52] U.S. Cl. .................................. 359/161
[58] Field of Search .......... 455/670, 601, 600, 606; 359/161

[56] References Cited

U.S. PATENT DOCUMENTS 4,994,675  2/1991  Levin et al. .................. 455/617

Primary Examiner—Curtis Kuntz
Assistant Examiner—Leslie Pascal
Attorney, Agent, or Firm—Staas & Halsey

[57] ABSTRACT

An optical transmission line system includes a first optical transmission line equipment having a pair of a first optical signal transmission unit and a first optical signal reception unit, and a second optical transmission line equipment having second optical signal transmission and reception units which are connected to the first optical signal transmission and reception units through downstream and upstream optical transmission lines. When light stoppage is detected by the optical signal reception unit due to the occurrence of a disconnection or other breakage in the optical transmission lines, a corresponding optical signal transmission unit reduces the transmission level of the light transmission signal to a level harmless to the human eye. In order to reduce the level of transmission, the optical signal transmission unit converts all the main signal data bits to "0" and sends only the small number of supervisory information bits to the optical signal reception unit of the other side. The optical signal reception unit operates so as to reduce the level of transmission of the optical signal transmission unit forming a pair with that unit.

19 Claims, 10 Drawing Sheets

SUPERVISORY INFORMATION (12 SERVICE BITS)

OPTICAL TRANSMISSION LINE SYSTEM

BACKGROUND OF THE INVENTION

1. Field of the Invention

The present invention relates to an optical transmission line system, more particularly to an optical transmission line system using laser light.

Along with the advances made in optical transmission line systems in recent years, the power of the laser light used has been raised to deal with the increasingly long distances of the optical transmission lines.

Therefore, in the case of disconnection or other breakage of the optical fibers used in the optical transmission lines, the laser light emitted from the point of disconnection, etc. may leak out and harm the eyes of the system maintenance personnel. Some measures are required to prevent this.

2. Description of the Related Art

Conventional optical transmission line systems, for example, optical transmission line systems constituted by a first telephone exchange office, a second telephone exchange office, and an optical transmission line connecting these telephone exchange offices, have been constructed as follows. Provision is made of first optical transmission line equipment and second optical transmission line equipment which perform the transmission and reception of downstream transmission signals and upstream transmission signals through a downstream optical transmission line and an upstream optical transmission line. Further, the first and second optical transmission line equipment include first and second optical signal transmission units, first and second optical signal reception units, and first and second light stoppage detecting means provided at the input stages of the first and second optical signal reception units.

Here, for example, if disconnection or other breakage occurs in the middle of the optical transmission line, the stoppage of the received light signal will be detected at the first light stoppage detecting means in the first optical transmission line equipment. When this happens, the operation of the corresponding first optical signal transmission unit will be stopped by the received light signal stoppage detecting signal and the transmission of the optical transmission signal to the downstream optical transmission line will be suspended. By this, the second light stoppage detecting means in the second optical transmission line equipment on the other side will output a received light signal stoppage detecting signal too. This received light signal stoppage detecting signal is applied to the corresponding second optical signal transmission unit to stop the drive of the second optical signal transmission unit. That is, the transmission of the optical transmission signal from the second optical signal transmission unit to the upstream optical transmission line is suspended. Therefore, the laser light leaking from the location of the disconnection or other breakage in the middle of the upstream optical transmission line disappears. Thus, it is possible to prevent damage to the eyes of the systems maintenance personnel who rush to the location of that disconnection or other breakage.

As mentioned above, in the conventional optical transmission line system, when one of the upstream or downstream optical transmission lines (for example, the upstream side) disconnects or breaks, the optical transmission line system stops transmitting and receiving completely despite the fact that there is no disconnection in the other optical transmission line (downstream) and it is normal. The complete cessation of transmission and reception in this way is a problem in that it ends up lowering the working efficiency of the optical transmission line system.

SUMMARY OF THE INVENTION

Therefore, the present invention has as its object to provide an optical transmission line system which can maintain the working efficiency at a certain high level even with disconnection, etc. of the optical transmission line.

To achieve the above object, the present invention newly introduces a light transmission level reducing means which, when stoppage of the received light signal is detected by the above-mentioned light stoppage detecting means, reduces to a level harmless to the human eye the transmission level of the light transmission signal from the optical signal transmission unit provided inside the optical transmission line equipment in which the light stoppage detecting means is provided.

Further, in the reception side in the optical transmission line equipment, there is introduced a means for detecting, apart from the light signal stoppage, the reduction of the level of the received light signal. The above-mentioned light transmission level reducing means is activated when either the detecting signal from the level reduction detecting means or the above-mentioned received light signal stoppage detecting signal is generated.

Preferably, the above-mentioned light transmission level reducing means makes "0" all the main signal data bits in the light transmission signal, which is constituted of main signal data bits and a small number of bits of supervisory information, and thereby reduces the average light transmission level. The supervisory information bits are small in number, so even if all the supervisory information bits were to become "1" (when light is generated), the intensity of the light would not be irritating in any way to the eye of the maintenance personnel. In this way, even if disconnection or other breakage of the optical transmission line occurs, the supervisory information can be sent to the optical transmission line equipment on the other side and the working efficiency of the optical transmission line system can be vastly improved compared with the situation in the past when disconnection or other breakage occurred.

If there are optical transmission line systems not using such supervisory information bits, all of the main signal data bits are not made "0", but are transformed into main signal data bits with an extremely low mark ratio and sent to the optical transmission line equipment of the other side, whereby the average light transmission level is reduced. In such a case, even with data bits with an extremely low mark ratio, it is possible to sufficiently supply to the optical transmission line equipment of the other side a small amount of supervisory information.

BRIEF DESCRIPTION OF THE DRAWINGS

The above object and features of the present invention will be more apparent from the following description of the preferred embodiments with reference to the drawings, wherein:

FIGS. 4, 4A and 4B form a block diagram of an embodiment of the principle of an optical transmission line system in accordance with the present invention;

DESCRIPTION OF THE PREFERRED EMBODIMENTS

Before describing the embodiments of the present invention, the related art and the disadvantages therein will be described with reference to the related figures.

Figure 1:
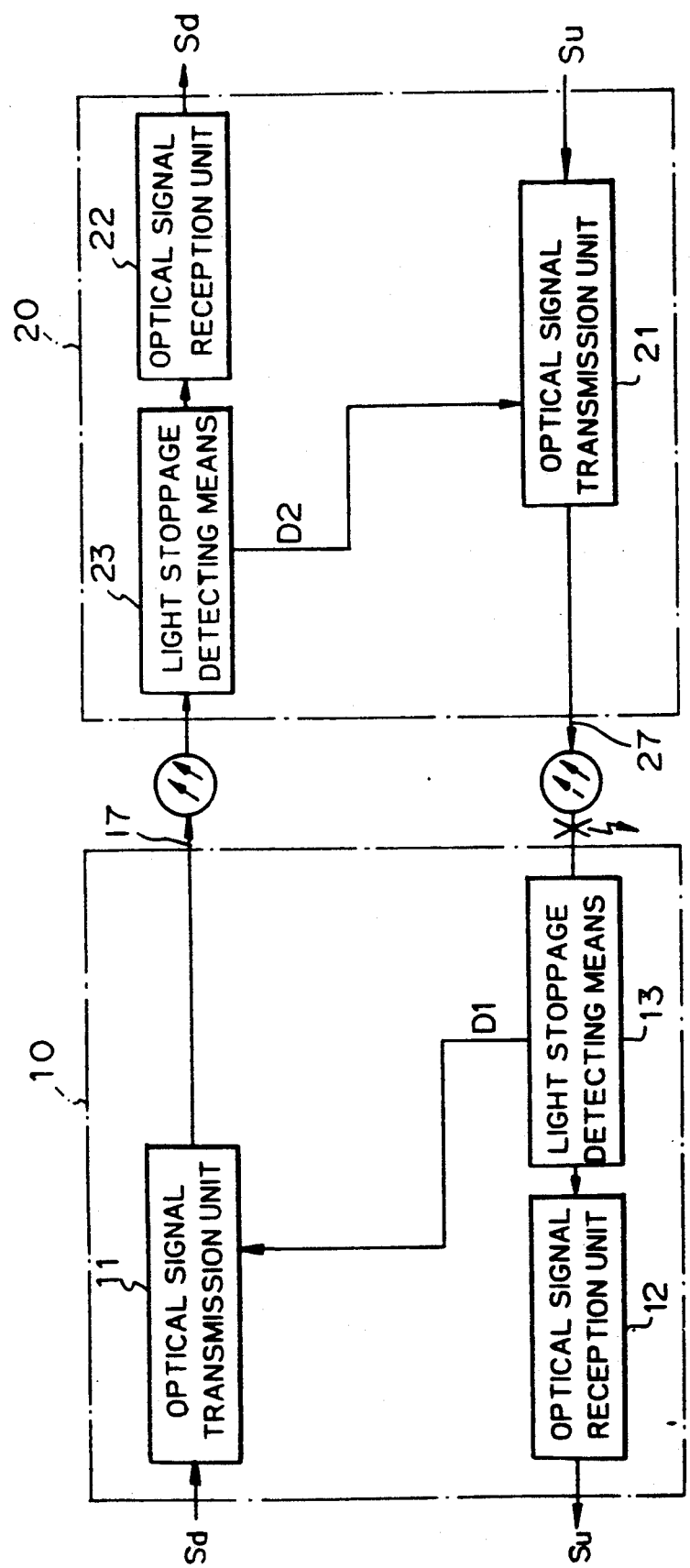
FIG. 1 is a block diagram of a conventional optical transmission line system.

FIG. 1 is a block diagram of a conventional optical transmission line system. The conventional optical transmission line system shown in the figure is provided with a first optical transmission line equipment 10 and second optical transmission line equipment 20 which perform the transmission and reception of downstream transmission signals Sd and upstream transmission signals Su through a downstream optical transmission line 17 and an upstream optical transmission line 27. The first and second optical transmission line equipment 10 and 20 include first and second optical signal transmission units 11 and 21, first and second optical signal reception units 12 and 22, and first and second light stoppage detecting means 13 and 23 provided at the input stages of the first and second optical signal reception units.

Here, for example, if disconnection or other breakage (shown by x mark in the figure) occurs in the middle of the upstream optical transmission line 27, the stoppage of the received light signal is detected at the first light stoppage detecting means 13 in the first optical transmission line equipment 10. When this happens, the operation of the corresponding first optical signal transmission unit 11 will be stopped by the received light signal stoppage detecting signal D1, and the transmission of the light transmission signal to the downstream optical transmission line 17 will be suspended. By this, the second light stoppage detecting means 23 in the second optical transmission line equipment 20 on the other side will output a received light signal stoppage detecting signal D2. This received light signal stoppage detecting signal D2 is applied to the corresponding second optical signal transmission unit 21 to stop the drive of the second optical signal transmission unit 21. That is, the transmission of the light transmission signal from the second optical signal transmission unit 21 to the upstream optical transmission line 27 is suspended. Therefore, the laser light leaking from the location of the disconnection or other breakage (x mark) in the middle of the upstream optical transmission line 27 disappears. Thus, it is possible to prevent damage to the eyes of the systems maintenance personnel who rush to the location of that disconnection or other breakage.

In the conventional optical transmission line system mentioned above, however, the previously mentioned problem occurs of deterioration of the working efficiency.

Figure 2:
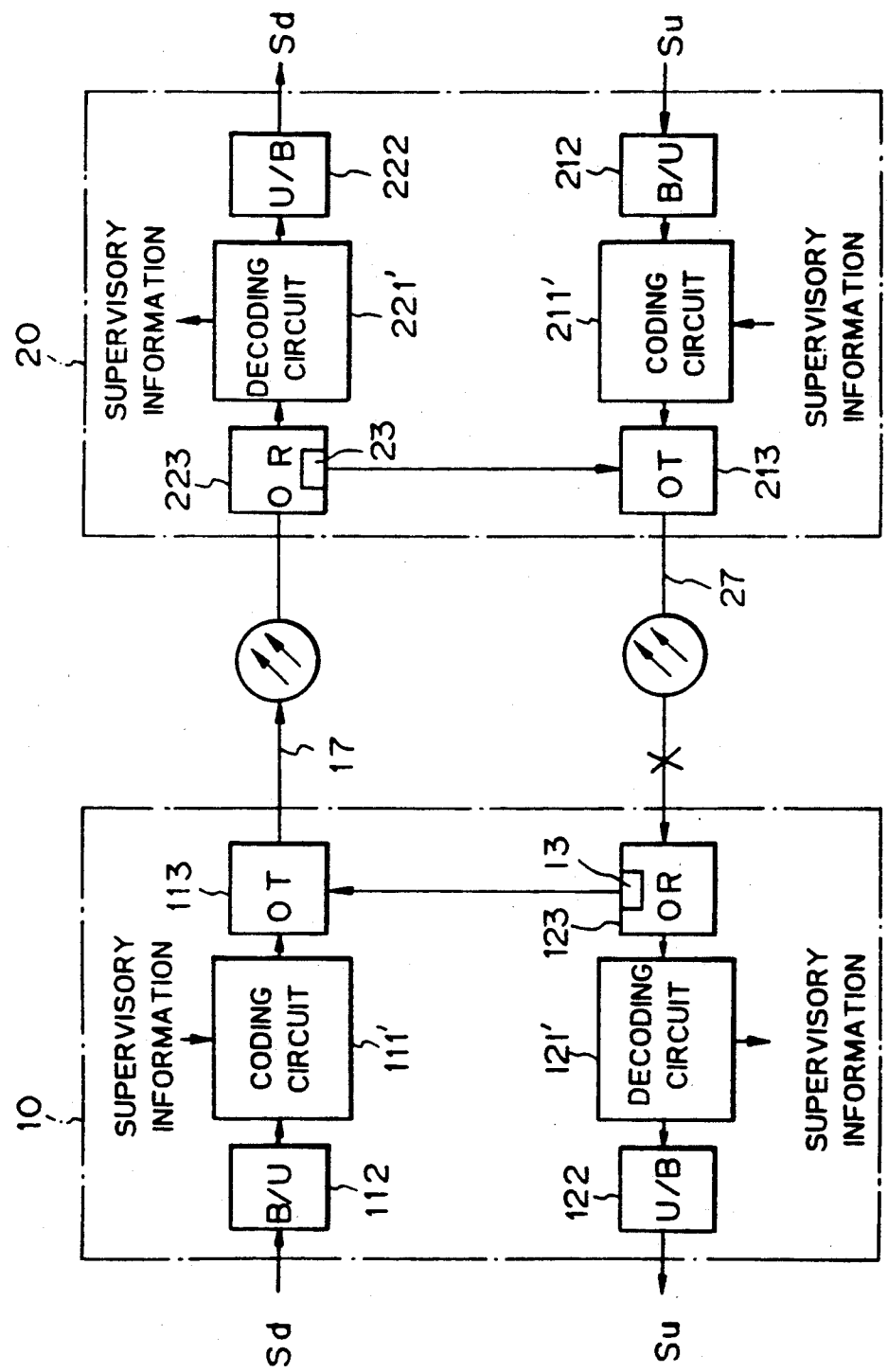
FIG. 2 is a circuit diagram of the specific construction of a conventional optical transmission line system.

FIG. 2 is a circuit diagram of the specific construction of a conventional optical transmission line system. Note that throughout the figures, the same component elements are given the same reference numerals or symbols.

In the optical transmission line equipment 10, the downstream transmission signals Sd are received by a bipolar/unipolar converting circuit (B/U) 112 which serves as an interface. Supervisory information (SV) collected at one's own office (10) is inserted into the predetermined service bits; for example, overhead bits in the six bits by the 5B/6B coding circuit 111'. The main signal data bits and supervisory information bits are converted to laser light by an optical transmission circuit (OT) 113, and the light is sent to the optical transmission line equipment 20 through the optical transmission line 17. Note that in the circuit 111', the main signal data bits are divided into units of five bits and the five bits of each unit are converted into six bits of data (three "1"s and three "0"s with a mark ratio of 50 percent. This is done to enable reliable extraction of the timing clocks on the receiving side. However, this 5B/6B conversion is only one example, and there are other systems using coding circuits using the known scrambler conversion as well. Below, a detailed explanation is given of the example of the case of use of a coding circuit of the 5B/6B conversion type.

In the optical transmission line equipment 20, the downstream transmission signal (laser light signal) from the optical transmission line equipment 10 is received at an optical reception circuit (OR) 223 and converted into electrical signals. The supervisory information in the O/H bits are taken out by the 5B/6B decoding circuit 221', then the downstream transmission signal Sd is transmitted from the unipolar/bipolar converting circuit 222 serving as an interface.

The transmission of data from the optical transmission line equipment 20 to the optical transmission line equipment 10 is performed in exactly the same way as above. The component elements (212, 211', 213, 123, 121', and 122) performing this upstream side data transmission are completely equivalent to the component elements performing this upstream side data transmission.

Figure 3A:
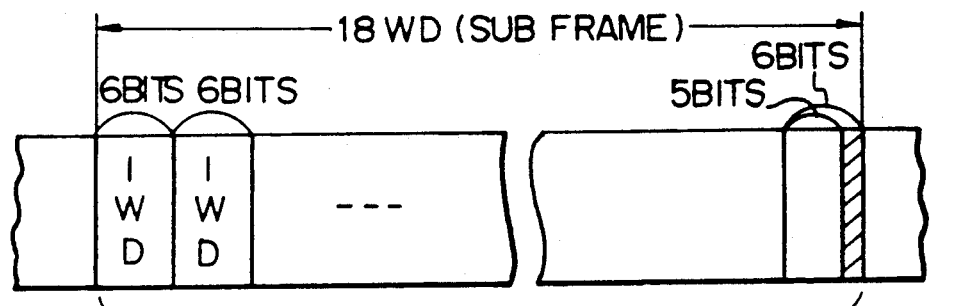
FIG. 3(a), 3(b) and 3(c) are format diagrams diagram of a transmission signal used in a 5B/6B conversion type of an optical transmission line system.
Figure 3B:
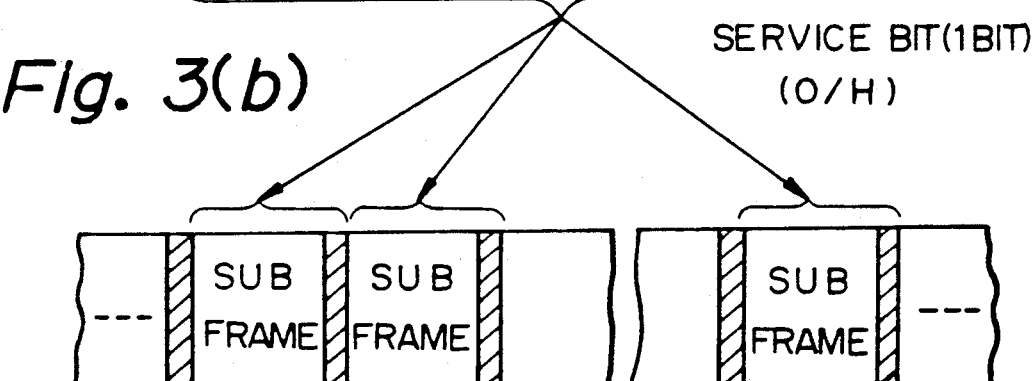
Figure 3C:
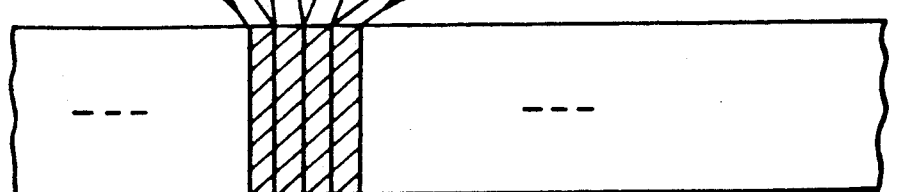

FIG. 3(a), 3(b) and 3(c) are format diagrams of a transmission signal used in a 5B/6B conversion type optical transmission line system. As shown in FIG. 3(a) six bits are used as one word (WD) and 18 words as one subframe. One bit of a service bit (O/H) is provided in one subframe. As shown in the FIG. 3(b), 12 of the service bits, that is, 12 subframes worth, are collected. By this, it is possible to form the supervisory information shown in FIG. 3(c).

In the optical transmission line system, shown in FIG. 2, when there is a disconnection in the upstream optical transmission line, the light stoppage detection means 13 in the optical reception circuit (OR) 123 of the optical transmission line equipment 10 detects the stoppage of the received light, controls the optical transmission circuit (OT) 113, and prevents laser light from being sent to the transmission line 17. This being so, the light stoppage detecting means 23 provided in the optical receptor circuit (OR) 223 of the optical transmission line equipment 20 detects the stoppage of the received light signal and performs control to prevent the laser light from being sent to the upstream optical transmission line 27. As a result, there is no longer any leakage of laser light from the disconnected or broken location (x).

When optical fibers 17 and 27 are disconnected in both directions, the transmissions of laser light by the optical transmission circuits 113 and 213 in the optical transmission line equipment 10 and 20 both stop.

In this way, laser light is prevented from being emitted from the cut section of the optical fiber upon disconnection or other breakage of the optical fiber, and the eyes of the systems maintenance personnel are protected. Such an optical transmission line system, however, is disadvantageous in terms of operating efficiency, as has been already mentioned.

Figure 4A:
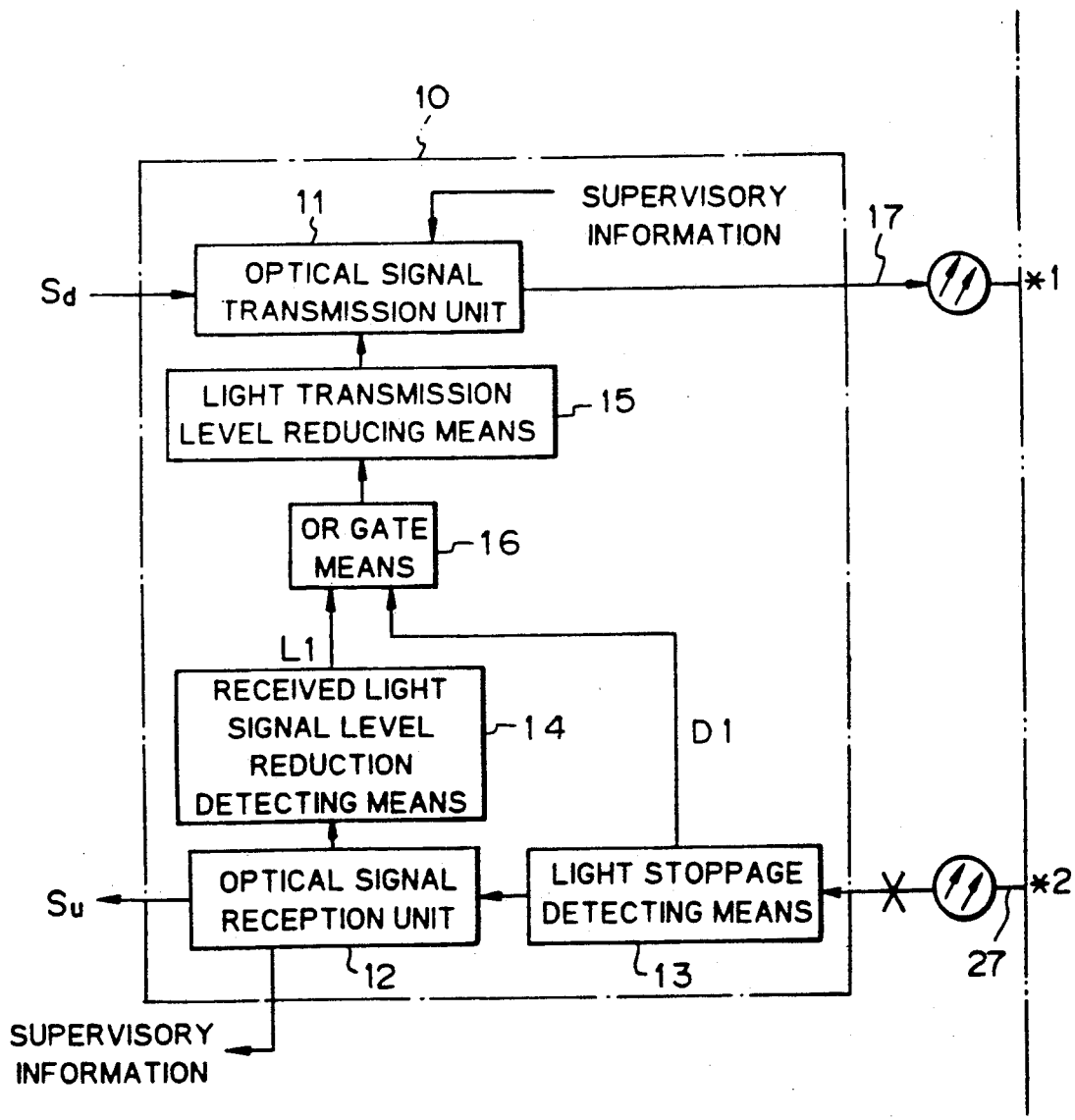
Figure 4B:
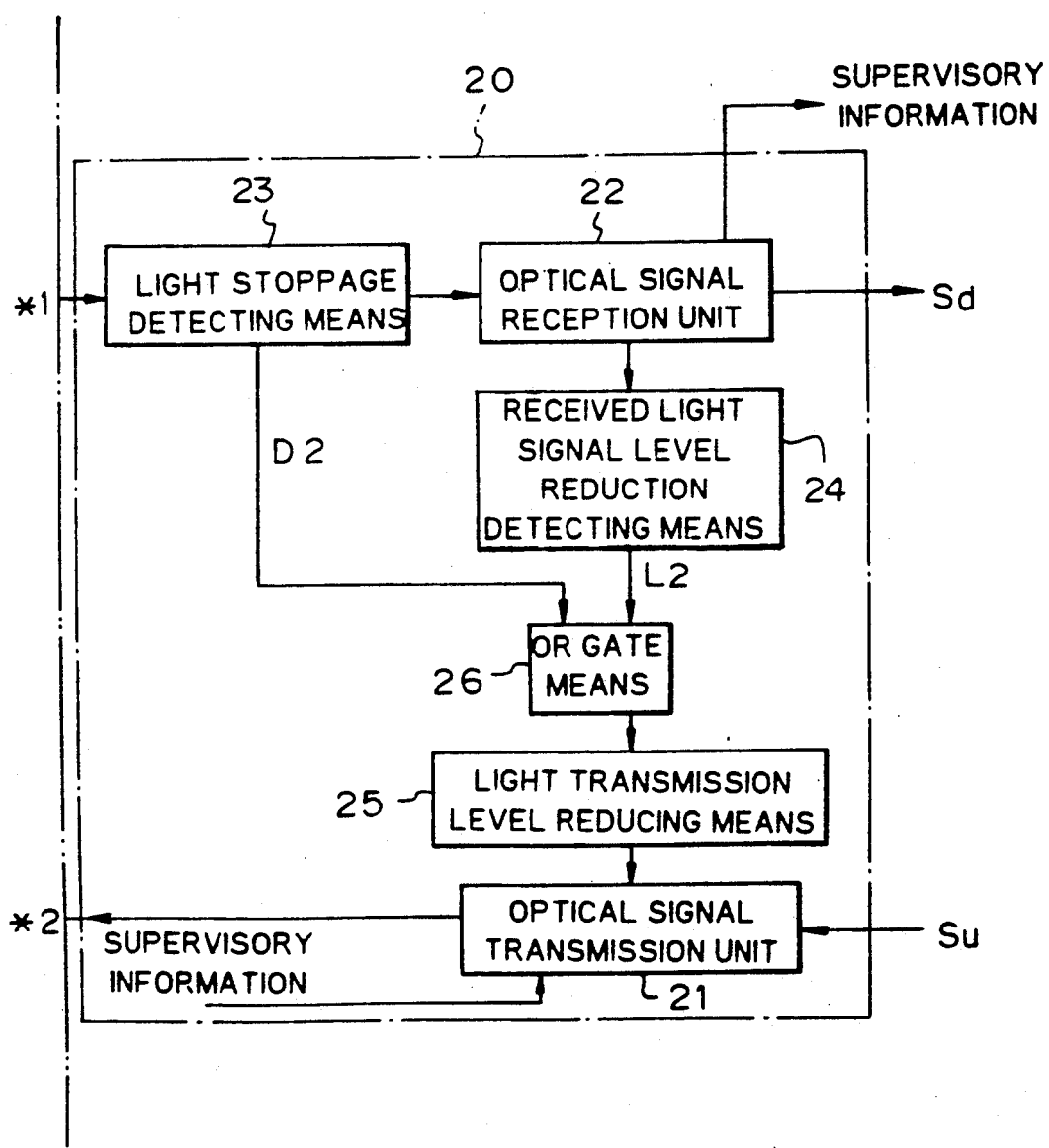

FIGS. 4A and 4B form a block diagram of an optical transmission line system in accordance with the present invention. There are the following differences from the conventional optical transmission line system (FIG. 1).

First, the first and second optical signal transmission units 11 and 21 are further provided with first and second light transmission level reducing means 15 and 25 which cooperate with each other.

The first and second light transmission level reducing means 15 and 25 are driven when the first and second light stoppage detecting means 13 and 23 detect stoppage of the received light signals and reduce the transmission level of the light transmission signals from the first and second optical signal transmission units 11 and 21 to a level harmless to the human eye.

Further, the first and second optical signal reception units 12 and 22 are provided with first and second received light signal level reduction detecting means 14 and 24 which cooperate with each other and detect if the level of the received light signals is much lower than the usual received level.

Still further, provision is made of first and second OR gate means 16 and 26.

The first OR gate means 16 receives as input the first received light signal stoppage detecting signal D1 from the first light stoppage detecting means 13 or the first level reduction detecting signal L1 from the first received light signal level reduction detecting means 14 and, where either of the detecting signals D1 or L1 is generated, drives the first light transmission level reducing means 15.

The second OR gate means 26 receives as input the second received light signal stoppage detecting signal D2 from the second light stoppage detecting means 23 or the second level reduction detecting signal L2 from the second received light signal level reduction detecting means 24 and, where either of the detecting signals D2 or L2 is generated, drives the second light transmission level reducing means 25.

The first light transmission level reducing means 15 makes "0" all of the downstream main signal data bits of the downstream main signal data bits and the small number of downstream supervisory information bits composing the light transmission signal sent to the downstream optical transmission line 17.

In the same way, the second light transmission level reducing means 25 makes "0" all of the upstream main signal data bits of the upstream main signal data bits and the small number of upstream supervisory information bits composing the light transmission signal sent to the upstream optical transmission line 27.

Through the light transmission line out of the downstream or upstream optical transmission line 17 or 27 which is normal and not disconnected (shown by x mark in FIG. 4), the downstream or upstream supervisory information bits (downstream supervisory bits in the illustrated example) are transmitted from the optical transmission line equipment 10 of the transmission side to the optical transmission line equipment 20 of the reception side. Only the supervisory information is made usable in the system even after the occurrence of a disconnection or other breakage of the transmission line.

One question will arise in regard to the explanation made up to now. The question is that, in the example of FIG. 4, the disconnection is in the middle of the upstream optical transmission line 27, so it should be possible to reduce the light transmission level from the optical signal transmission unit just at the upstream side second light signal transmission unit 21, so why is the light transmission level reduced at the downstream side first optical signal transmission unit 11 connected to the normal optical transmission line 17 as well? There are two answers to this.

The first is that when the above-mentioned disconnection occurs, the optical transmission line system cannot immediately judge where that disconnection occurred. That is, the first light stoppage detecting means 13 detects the stoppage of the received light signal, but cannot immediately determine that the stoppage was caused in the middle of the upstream optical transmission line 27. The reason is that even if the disconnection occurred in the middle of the downstream optical transmission line 17, the first light stoppage detecting means 13 would similarly detect stoppage of the received light signal. That is, just because the stoppage of the received light signal is detected by the upstream side first light stoppage detecting means 13, there is no guarantee that the downstream optical transmission line 17 is normal.

The second is related to the first answer. The disconnection of the optical transmission line may not occur just in one of the upstream and downstream optical transmission lines. In some cases, it may occur simultaneously in both of the upstream and downstream optical transmission lines 17 and 27. In such a case, both the first and second optical signal transmission units 11 and 21 must simultaneously reduce the light transmission levels, or else it will not be possible to protect the eyes of the systems maintenance personnel hurrying to the locations of the two disconnections. In such cases, however, the system is completely shut down.

Below, an explanation will be made of a specific example of the present invention.

Figure 5:
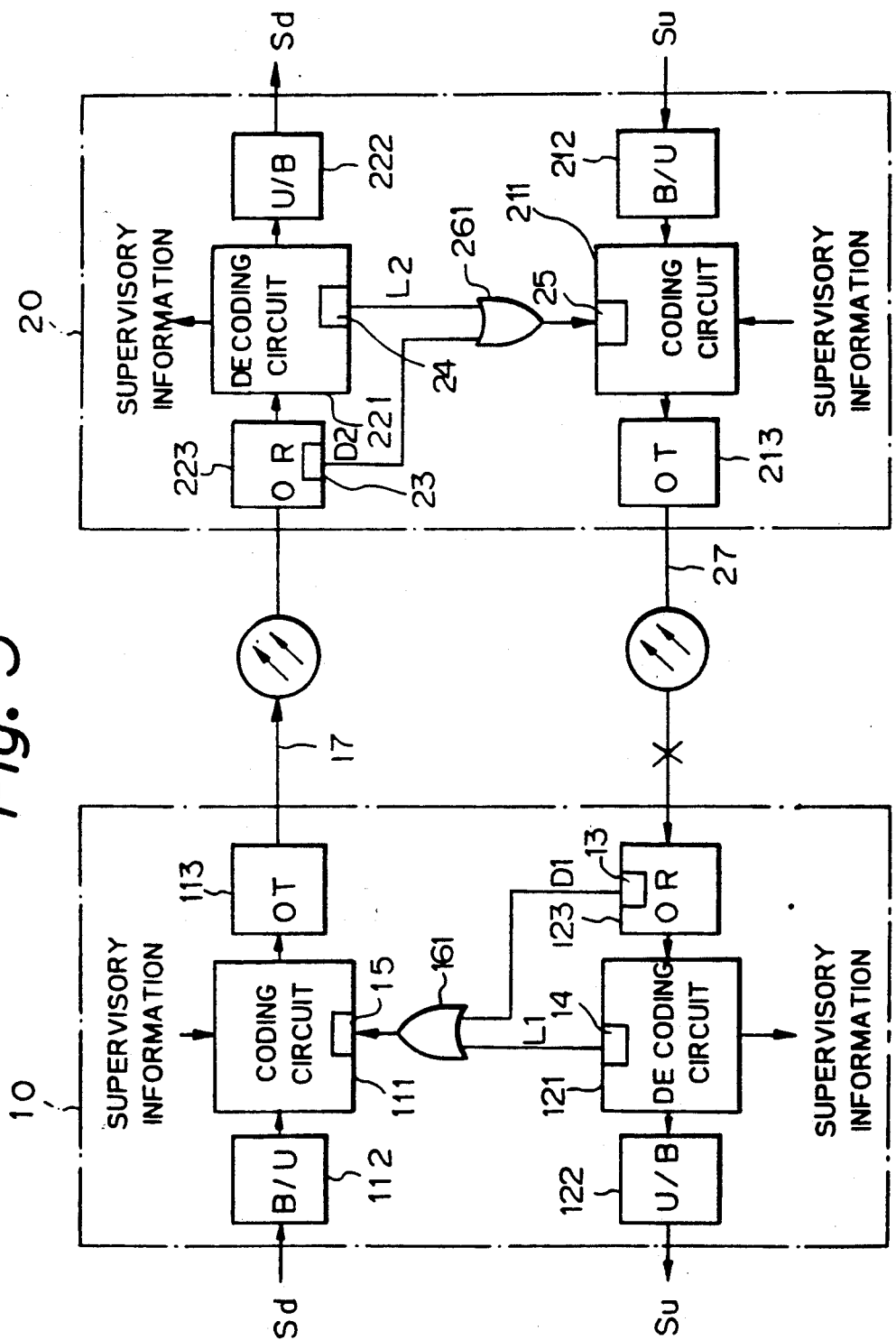
FIG. 5 is a block diagram of the specific construction of the optical transmission line system of the present invention.

FIG. 5 is a block diagram of the specific construction of the optical transmission line system of the present invention. This corresponds to the specific construction shown in FIG. 2. The first OR gate 161 and the second OR gate 261 in FIG. 5 correspond to the first and second OR gate means 16 and 26 in FIG. 4. The first and second coding circuits 111 and 211 in FIG. 5 include the first and second light transmission level reducing means 15 and 25, respectively, and therefor differ slightly in construction from the first and second coding circuits 111' and 211' shown in FIG. 2. Further, the first and second decoding circuits 121 and 221 of FIG. 5 include the first and second received light signal level reduction detecting means 14 and 24, respectively, and therefor differ slightly in construction from the first and second decoding circuits 121' and 221' of FIG. 2.

Referring to FIG. 5, the light stoppage detecting means 13 in the optical reception circuit (OR) 123 issues a stoppage detecting signal D1 of the received light signal or the decoding circuit 121 fetches the supervisory information composed of the service bits (O/H) and issues an all "0" detecting signal of the main signal data bits remaining after elimination of the supervisory information: that is, the received light signal level reduction detecting signal L1, from the level reduction detecting means 14. When the means 15 in the coding circuit 111 receives through the OR gate 161 the stoppage detecting signal D1 or the all "0" detecting signal L1, it changes the main signal data bits remaining after elimination of the supervisory information bits to all "0" and sends out the same.

In FIG. 5, when, for example, the upstream optical transmission line 27 is disconnected, the means 13 provided in the optical reception circuit (OR) 123 of the first optical transmission line equipment 10 issues a light stoppage detecting signal D1. In the coding circuit 111 receiving this light stoppage detecting signal D1, the light transmission signal with all the main signal data bits from which the supervisory information has been removed made "0" by the means 15, is sent from the optical transmission circuit (OT) 113 to the nondisconnected downstream optical transmission line 17.

In the second optical transmission line equipment 20, the means 23 in the optical reception circuit 5 (OR) 223 does not output a light stoppage detecting signal, but converts the received light signal into electrical signals and sends the same to the decoding circuit 221. The reason why the means 23 does not perform detection of light stoppage is as follows. The light stoppage detecting means 23 (same as means 13) may be realized using a known comparator which detects the magnitude of the output voltage from a known automatic gain control (AGC) monitor circuit (which forms a pair with the optical reception circuit 223 (OR)). This AGC monitor circuit, according to experiments, outputs 4.5 V for all "1" main signal data bits and outputs 1.0 V for all "0" main signal data bits (based on a dark current). When the received light signal is stopped, it outputs substantially 0 V. Therefore, when all "0" main signal data bits and "1""0" pattern supervisory information bits are received, the AGC monitor circuit outputs a bit over 1 V (1.0 V (1.0 V plus several tenths of a volt). The comparator can sufficiently discriminate the above 1.0 V output from the AGC monitor circuit at the time of detection of light stoppage. Therefore, the light stoppage detecting means 23 (same as means 13) does not output a stoppage detecting signal D2 when receiving light transmission signals composed of all "0" main signal data bits and "1""0" pattern supervisory information bits.

The decoding circuit 221 fetches the supervisory information bits to acquire the supervisory information and issues a signal L2, detecting by the means 24 that all the main signal data bits with the supervisory information bits eliminated at "0", through the OR gate 261 to the means 25 of the coding circuit 221. In response to this, the coding circuit 221 determines that a light transmission signal from its own office (20) is not being transmitted to the opposing equipment 10 due to disconnection of the optical transmission line 27 and sends a signal indicating that all of the main signal data bits are "0" through the optical transmission circuit (OT) 213 to the optical transmission line 27.

Therefore, the optical transmission line equipment 10 and 20 can extract and insert the supervisory information composed of the service bits, and simultaneously the main signal data bits all become "0", so the laser light emitted from the cut surface of the optical transmission line becomes extremely small in the level of power and will no harm the eyes of the systems maintenance personnel.

Figure 6:
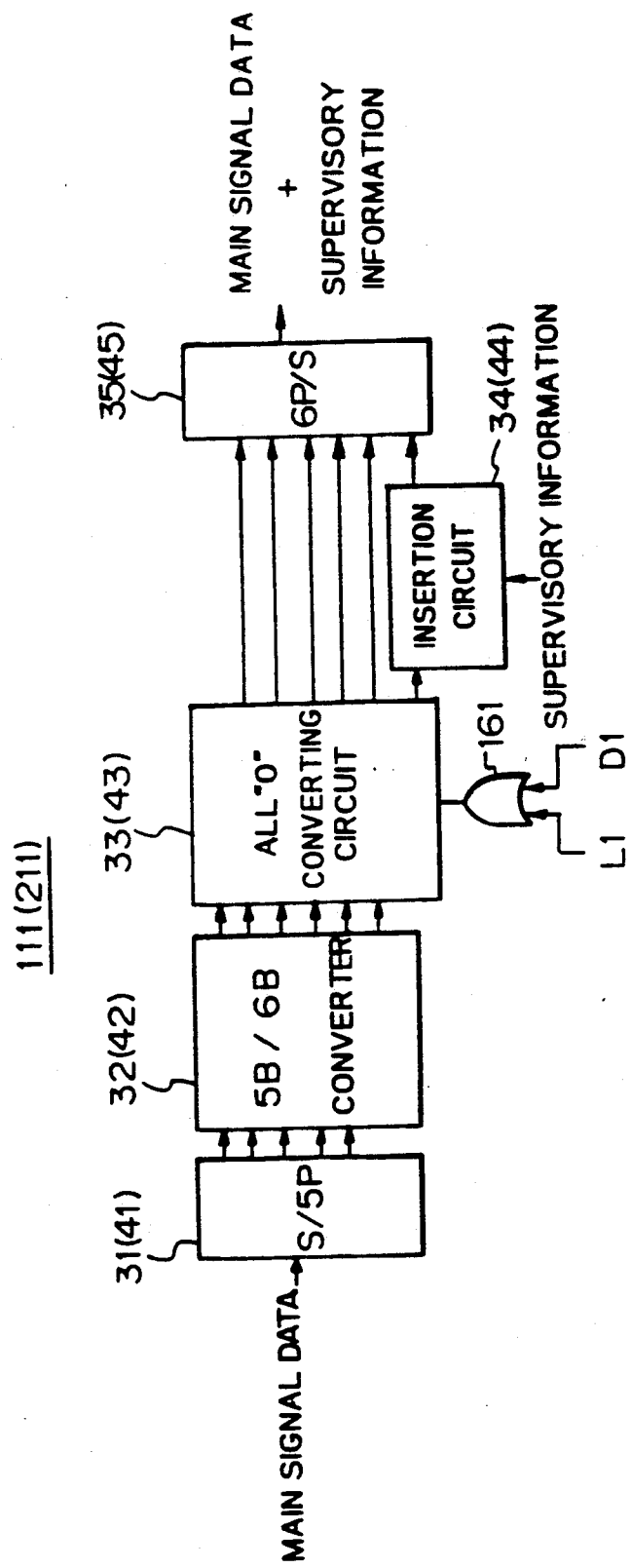
FIG. 6 is a block diagram of one example of a coding circuit.

FIG. 6 is a diagram of one example of a coding circuit. The figure shows the coding circuit 111 of FIG. 5. The coding circuit 211 of FIG. 5 is of exactly the same construction. Reference numerals 41 to 45 show component elements of the coding circuits 211 side.

Figure 7:
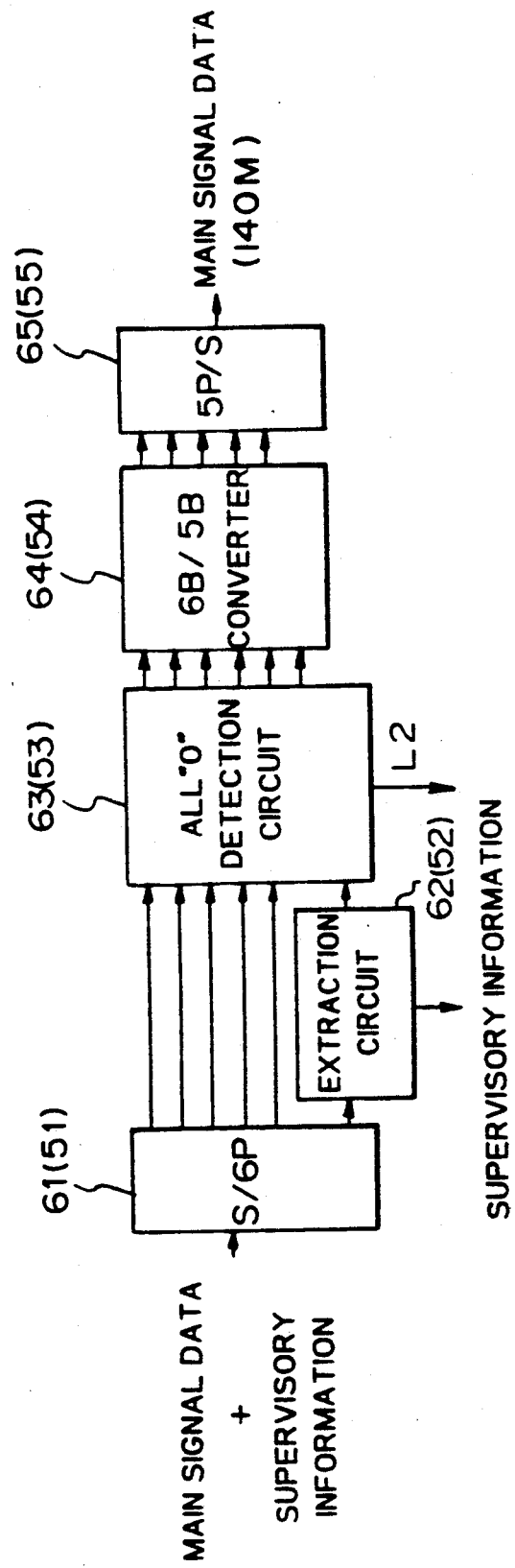
FIG. 7 is a block diagram of one example of a decoding circuit.

FIG. 7 is a diagram of one example of a decoding circuit. The figure shows the decoding circuit 221 of FIG. 5, but the decoding circuit 121 of FIG. 5 has exactly the same construction. Reference numerals 51 to 55 show component elements of the decoding circuit 121 side.

Below, an explanation will be made with reference to FIG. 6 and FIG. 7. The first and second light transmission level reducing means 15 and 25 shown in FIG. 4 and FIG. 5 are composed of first and second all "0" converting circuits 33 and 43 which convert all of the downstream and upstream main signal data bits to "0", respectively.

The first and second received light signal level reduction detecting means 14 and 24 are composed of first and second all "0" detecting circuits 53 and 63 which detect that all of the upstream and downstream main signal data bits are "0".

The coding circuit 111 shown in FIG. 6 is composed of an S/P converting circuit (S/5P) 31 which converts the electrical main signal serial data 9140 Mb/s) from the bipolar/unipolar converting circuit (B/U) 112 to five bits of parallel data, a 5B/6B converter 32 which converts the five bits of parallel output signal of the S/P converting circuit 31 to six bits of parallel output signal, and all "0" converting circuit 33 which converts the six bits of parallel output signal all to "0" based on the signals D1, L1 from the means 13 in the optical reception circuit 123 or the means 14 in the decoding circuit 121. An insertion circuit 34 which uses only one bit in the six bits of the parallel output signal from the all "0" converting circuit 33 as the supervisory information bit and inserts supervisory information (which may include so-called order wire signals) collected by its own office (10) into the supervisory information. A P/S converting circuit (6P/S) 35 which converts the six bits of the parallel signal of the five bits of main signal data and the supervisory information bit to a serial signal and sends it to the optical transmission circuit (OT) 113.

Further, the decoding circuit 221 shown in FIG. 7 is composed of an S/P converting circuit (S/6P) 61 which converts the serial data of the main signal data+supervisory information from the optical reception circuit (OR) 223 into six bits of parallel data, and an extraction circuit 62 which separates the supervisory information obtained from the supervisory information bit in the six bits of the parallel output signal of the S/P converting circuit 61. An all "0" detecting circuit 63 detects an all "0" state from the total six bits of the parallel data signal of the five bits of the parallel output signal from the S/P converting circuit 61 and the one bit of the output signal from the extraction circuit 62 and issues an all "0" detecting signal (L2). A 6B/5B converter 64 converts the six bits of parallel signal coming through the all "0" detecting circuit 63 into five bits of parallel signal, and a P/S converting circuit (5P/S) converts the five bits of parallel output to a serial output signal and sends the main signal data (140 Mb/s) to the unipolar/bipolar converting circuit 222.

Next, an explanation will be made of the operation of the circuit shown in FIG. 6 and FIG. 7 referring to FIG. 5.

In FIG. 6, the electrical main signal data is converted from bipolar signals to unipolar signals in the converting circuit 112 of the optical transmission line equipment 10 and input to the S/P converting circuit 31, whereby in the S/P converting circuit 31 it is converted into five bits of parallel signals. The above-mentioned five bits are given one bit of a supervisory information bit by the 5B/6B converter 32 to convert it to six bits of parallel data, and that data is input to the all "0" converting circuit 33.

The all "0" converting circuit 23 monitors the light stoppage detecting signal D1 from the means 13 in the optical reception circuit 123 or the all "0" detecting signal L1 from the means 14 in the decoding circuit 121 and when neither of these is generated, passes the six bits of output from the converter 32 as they are. When either is generated, the six bits of data are all converted to "0".

Whether or not the six bits of output from the all "0" converting circuit 33 is "0", the insertion circuit 34 inserts the supervisory information obtained in its own office (10) in the one bit of the service bit at certain periods (every 18 words in FIG. 3). Therefore, the P/S converting circuit 35 receives the five bits worth of main signal data and one bit of supervisory information or receives the five bits worth of all "0" main signal data plus the one bit of supervisory information, converts the same to a series signal, and sends it to the optical transmission circuit 113.

On the other hand, the decoding circuit 221 of FIG. 7, as mentioned above, receives the light signal from the opposing equipment 10 at the optical reception circuit 223, and converts the serial data which has been converted into electrical signals into six bits of parallel data by the S/P converting circuit 61. The decoding circuit 22 uses the one bit of supervisory information in the same way as the supervisory information at the extraction circuit 62, extracts it at certain periods (every 18 words), and sends the same to the all "0" detecting circuit 63.

The all "0" detecting circuit 63 judges if all of the five bits of the main signal data are "0". When all are "0", it issues an all "0" detecting signal L2, gives the same to the means 25 in the coding circuit 211 in the same equipment 20 as mentioned before, and sends the parallel data as is to the 5B/6B converter 64.

The converter 64 cuts the supervisory information bit, sends just the five bits of the parallel main signal data to the P/S converting circuit 65, converts the serial main signal data to bipolar data by the unipolar/bipolar converting circuit 222, and sends it out. The data is supplied to a multiplexer/demultiplexer in the telephone office, for example.

In this way, the coding circuit 211 of the equipment 20 receives the all "0" detecting signal at the means 25, so that in exactly the same way as explained with reference to FIG. 6, all bits except the supervisory information bit are converted to "0" and sent to the optical transmission line 27, so that the light irradiation power at the cut surface of the optical fiber becomes extremely small and it is possible to protect the eyes of the systems maintenance personnel.

Figure 8:
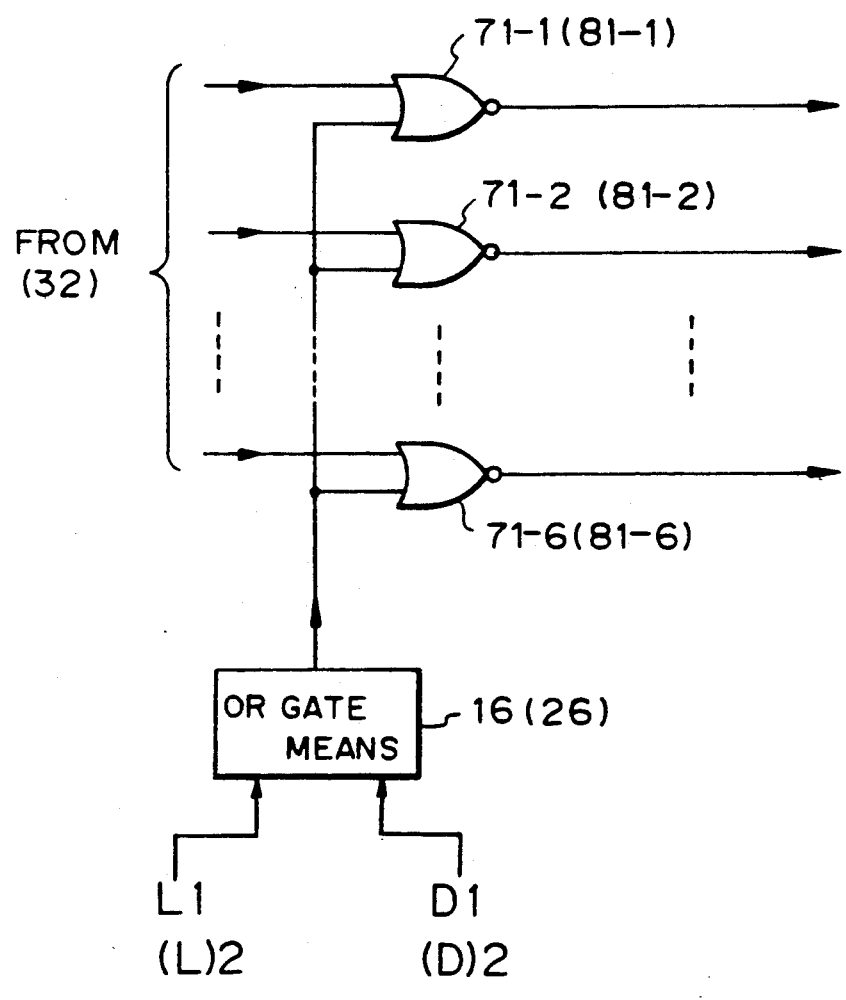
FIG. 8 is a block diagram of one example of an all "0" converting circuit.
Figure 9:
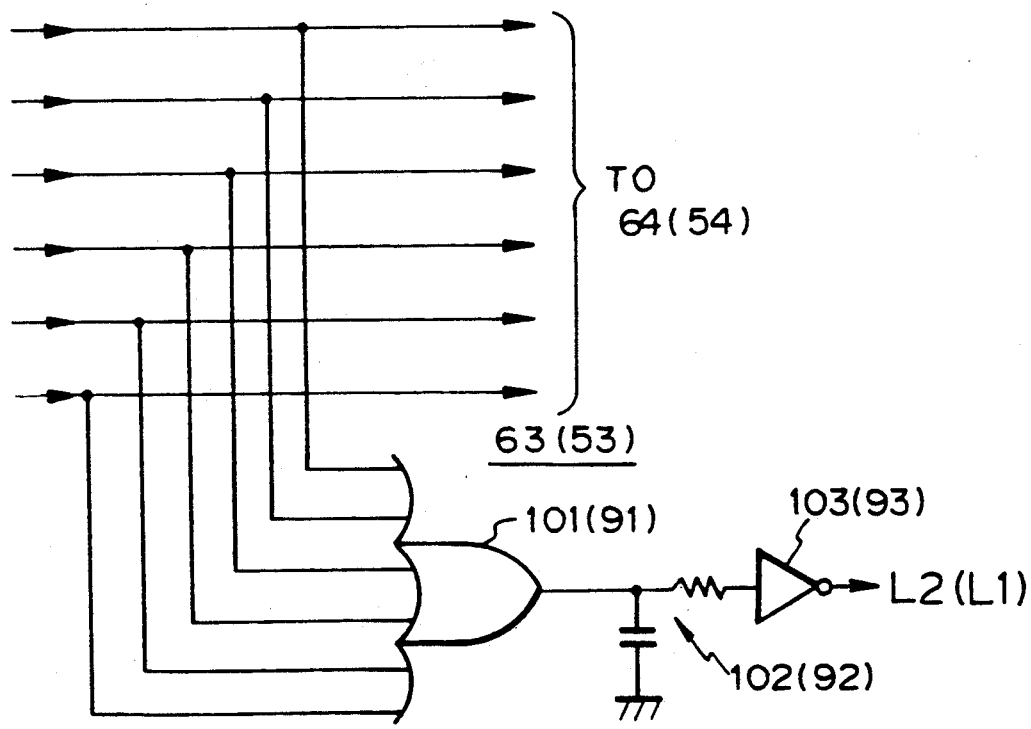
FIG. 9 is a block diagram of one example of an all "0" detecting circuit.

FIG. 8 is a logic diagram of one example of an all "0" converting circuit, and FIG. 9 is a logic diagram of one example of an all "0" detecting circuit.

The previously mentioned downstream transmission signal (Sd), that is, the main signal data, is processed by the parallel data converted from 5 bits to six bits in the first optical transmission line equipment 10. The first all "0" converting circuit 33 is composed of NOR gates 71-1 to 71-6 which have as first inputs the signals of each bit of the six bits and as common second inputs the output of the first OR gate means 16.

The afore-mentioned upstream transmission signal Su, that is, the main signal data, is processed by the parallel data converted from five bits to six bits in the second optical transmission line equipment 20. The second all "0" converting circuit 43 is composed of NOR gates 81-1 to 81-6 which have as first inputs the signals of each of the bits of the six bits and have as common second inputs the output of the second OR gate means 26.

Referring to FIG. 9, the downstream transmission signal Sd, that is, the main signal data, is processed by the parallel data converted from five bits to six bits in the second optical transmission line equipment 20. The second all "0" detecting circuit is composed of a second OR gate 101 which has as its input each bit of the six bits.

The upward transmission signal Su, that is, the main signal data, is processed by the parallel data converted from five bit to six bits in the first optical transmission line equipment 10. The first all "0" detecting circuit 53 is composed of a first OR gate 91 which has as its input each bit of the six bits.

At the output stage of the OR gate 101 (91), provision is made of, for example, a CR integrating circuit 102 (92). An all "0" detecting output is obtained from the CR integrating circuit 102 (92) through a buffer 103 (93). The sixth bit of the input of the all "0" detecting circuit of FIG. 7 is the supervisory information bit. Once every subframe, the bit does not become "0", but become "1". At this time, all the bits do not become "0", so the data is passed through the integrating circuit 102 (92) and the bit "1" which appears at the sixth bit of the same is forcibly made "0". By making the time constant of the integrating circuit sufficiently larger than the period of the subframe, it is possible to make the bit "1" appear to be "0".

In this way, according to the optical transmission line system of the present invention, when the decoding circuit fetches the supervisory information composed of the service bit and issues an all "0" detecting signal (L1, L2) of the main signal data bits after elimination of the supervisory information bit or else the optical reception circuit issues a light stoppage detecting signal (D1, D2) and the same is given to the coding circuit, the coding circuit converts all the main signal data bits after removal of the supervisory bit "0", so it is possible to perform transmission of the supervisory data through the one normal optical transmission line. Further, only extremely low power laser light is sent out from the disconnected section of the optical transmission line, so there is no adverse effect on the eyes of the systems maintenance personnel.

What is claimed is:

1. An optical transmission line system comprising:
   first optical transmission line equipment and second optical transmission line equipment, each of which performs the transmission and reception of downstream transmission signals and upstream transmission signals; and a downstream optical transmission line and an upstream optical transmission line, each of which is coupled to said first and second optical transmission line equipment, for carrying the downstream and upstream transmission signals, respectively, said first and second optical transmission line equipment respectively including:

first and second optical signal transmission units, respectively coupled to said downstream optical transmission line and said upstream optical transmission line;

first and second optical signal reception units, respectively coupled to said upstream optical transmission line and said downstream optical transmission line, each of said first and second optical signal reception units having input stages; and first and second light stoppage detecting means provided at the input stages of said first and second optical signal reception units, respectively, said first and second optical signal transmission units respectively having first and second light transmission level reducing means which cooperate with each other, and said first or second light transmission level reducing means being respectively driven when stoppage of a light signal carried by said upstream or downstream optical transmission lines is detected by said first or second light stoppage detecting means, respectively, to reduce to a level which is greater than zero but harmless to the human eye, the transmission level of the light transmission signal outputted by the corresponding one of said first and second optical signal transmission units.

2. An optical transmission line system as set forth in claim 1, wherein said first and second optical signal reception units include first and second light signal level reduction detecting means, respectively which detect when the level of a received light signal is lower than a predetermined reception level.

3. An optical transmission line system as set forth in claim 2, wherein said first and second optical transmission line equipment further include first and second OR gate means, respectively said first OR gate means receiving, as an input, a first received light signal stoppage detecting signal from said first light stoppage detecting means and a first level reduction detecting signal from said first received light signal level reduction detecting means, and for driving said first light transmission level reducing means when one of the detecting signals is issued, said second OR gate means receiving, as an input, a second received light signal stoppage detecting signal from said second light stoppage detecting means and a second level reduction detecting signal from said second received light signal level reduction detecting means and for driving said second light transmission level reducing means when one of the detecting signals is issued.

4. An optical transmission line system as set forth in claim 3, wherein said first light transmission level reducing means makes "0" all of the downstream main signal data bits and a predetermined number of bits of downstream supervisory information forming the light transmission signal sent out to the downstream optical transmission line; and said second light transmission level reducing means makes "0" all of the upstream main signal data bits and a predetermined number of bits of upstream supervisory information forming the light transmission signal sent out the upstream optical transmission line.

5. An optical transmission line system as set forth in claim 4, wherein at least one downstream or upstream supervisory information bit is sent, through the one of the optical transmission lines of the downstream and upstream optical transmission lines which is normal and not disconnected, from the optical transmission line equipment of the sending side to the optical transmission line equipment of the receiving side, only the supervisory information being used in the system after the disconnection of the transmission line.

6. An optical transmission line system as set forth in claim 4, wherein said first and second optical transmission level reducing means comprise first and second all "0" converting circuits, respectively, for converting all of the downstream and upstream main signal data bits to "0".

7. An optical transmission line system as set forth in claim 6, wherein said first and second all "0" converting circuits each convert six bits, wherein the six bits form one word, wherein a plurality of words are used to form one subframe, wherein one bit of the six bits composing the last word in one subframe is made the supervisory information bit, wherein the supervisory information is formed by a plurality of supervisory information bits collected from a plurality of subframes, and wherein said system further comprises first and second insertion circuits which insert at predetermined periods a supervisory information bit at one bit of the six bits output from said first and second al "0" converting circuits, respectively.

8. An optical transmission line system as set forth in claim 6, wherein said first optical transmission line equipment further comprises means for processing the downstream transmission signal by converting parallel data from five bits to six bits in said first optical transmission line equipment, and wherein said first all "0" converting circuit is comprised of NOR gates which have, as first inputs, respective ones of the six bits and have, as common second inputs, the output of said first OR gate means.

9. An optical transmission line system as set forth in claim 6, wherein said second optical transmission line further comprises means for processing the upstream transmission signal by converting parallel data from five bits to six bits in said second optical transmission line equipment, and wherein said second all "0" converting circuit is comprised of NOR gates which have, as first inputs, respective ones of the six bits and have, as common second inputs, the output of said second OR gate means.

10. An optical transmission line system as set forth in claim 6, wherein said first and second received light signal level reduction detecting means comprise first and second all "0" detecting circuits, respectively, for detecting when the upstream and downstream main signal data bits are all "0".

11. An optical transmission line system as set forth in claim 10, wherein said second optical transmission line equipment further comprises means for processing the downstream transmission signal by converting parallel data from five bits to six bits in said second optical transmission line equipment, and wherein said second all "0" converting circuit is comprised of a second OR gate which has, as its first input, the bits of the six bits.

12. An optical transmission line system as set forth in claim 10, wherein said first optical transmission line equipment further comprises means for processing the upstream transmission signal by converting parallel data from five bits to six bits in said first optical transmission line equipment, and wherein said first all "0" converting circuit is comprised of a first OR gate which has, as its first input, the bits of the six bits.

13. An optical transmission line system as set forth in claim 10, wherein said first and second "0" detecting circuits detect six bits, wherein the six bits form one word, wherein a plurality of words are used to form one subframe, wherein one bit of the six bits composing the last word in one subframe is made the supervisory information bit, wherein the supervisory information is formed by a plurality of supervisory information bits collected from a plurality of subframes, and wherein said system further comprises first and second extraction circuits which extract at predetermined periods a supervisory information bit from one bit of the six bits input to said first and second all "0" detecting circuits.

14. An optical transmission line system comprising:
first and second means for transmitting and receiving selectively upstream and downstream optical transmission signals; and
means for providing the upstream and downstream optical transmission signals to and from said first and second means, each of said first and second means comprising:
an optical signal transmission unit for receiving one of the upstream and downstream transmission signals and for retransmitting said one of the upstream and downstream transmission signals;
a light stoppage detector for receiving the other of the upstream and downstream transmission signals and for generating a first detection signal when said other of the upstream and downstream transmission signals has stopped; and
a light transmission level reducing circuit, coupled to said optical signal transmission unit and said light stoppage detector, for reducing the transmission level of said retransmitted one of the upstream and downstream transmission signals which is output by said optical signal transmission unit when the first detection signal is generated, to a level which is greater than zero but which is substantially harmless to the human eye.

15. An optical transmission line system as set forth in claim 14, wherein each of said first and second means further comprises a light signal level reduction detector, coupled to said light stoppage detector and to said light transmission level reducing circuit, for detecting when the level of said other of the upstream and downstream transmission signals is lower than a predetermined level, and for providing a second detection signal to said light transmission level reducing circuit, said light transmission level reducing circuit reducing the transmission level of said retransmitted one of the upstream and downstream transmission signals when either of the first and second detection signals is generated.

16. Optical transmission line equipment coupled to receive first and second optical reception signals, comprising:

an optical signal transmission unit coupled to receive the first optical reception signal and for providing a first optical transmission signal;
a received light signal level reduction detector, coupled to receive the second optical reception signal, for providing a first detection signal when the second optical reception signal has a level which is below a predetermined reception level; and
a light transmission level reducing circuit, coupled to said optical signal transmission unit and said received light signal level reduction detector, for reducing the transmission level of the first optical transmission signal to a level which is substantially harmless to the human eye when the first detection signal is generated.

17. Optical transmission line equipment as set forth in claim 16, further comprising:
a light stoppage detector, coupled to receive the second optical reception signal and coupled to said light transmission level reducing circuit, for providing a second detection signal to said light transmission level reducing circuit when the second optical reception signal has stopped, said light transmission level reducing circuit reducing the transmission level of the first optical transmission signal when the second detection signal is generated.

18. An optical transmission line system comprising:
first optical transmission line equipment and second optical transmission line equipment, each of which performs the transmission and reception of downstream transmission signals and upstream transmission signals at an output side and an input side, respectively, each of the upstream and downstream transmission signals including a main signal and a supervisory signal; and
a downstream optical transmission line and an upstream optical transmission line, each of which is coupled to said first and second optical transmission line equipment, for carrying the downstream and upstream transmission signals, respectively, said first and second optical transmission line equipment respectively including:
first and second optical signal transmission units, respectively coupled to said downstream optical transmission line and said upstream optical transmission line;
first and second optical signal reception units, respectively coupled to said upstream optical transmission line and said downstream optical transmission line, each of said first and second optical signal reception units having input stages; and
first and second light stoppage detecting means provided at the input stages of said first and second optical signal reception units, respectively, said first and second optical signal transmission units respectively having first and second light transmission level reducing means which cooperate with each other, and
said first or second light transmission level reducing means being respectively driven when stoppage of a light signal carried by said upstream or downstream optical transmission lines is detected by said first or second light stoppage detecting means, respectively, to reduce to a level harmless to the human eye the transmission level of the light transmission signal output by the corresponding one of said first and second optical signal transmission units, by reducing the transmission level of the main signal while maintaining the transmission level of at least a portion of the supervisory signal.

19. An optical transmission line system comprising:

first and second means for transmitting and receiving both upstream and downstream optical transmission signals, each of the upstream and downstream transmission signals including a main signal and a supervisory signal; and means for providing the upstream and downstream optical transmission signals to and from said first and second means, each of said first and second means comprising:

an optical signal transmission unit for receiving one of the upstream or downstream transmission signals and for retransmitting said one of the upstream or downstream transmission signals;

a light stoppage detector for receiving the other of the upstream or downstream transmission signals and for generating a first detection signal when said other of the upstream or downstream transmission signals has stopped; and a light transmission level reducing circuit, coupled to said optical signal transmission unit and said light stoppage detector, for reducing the transmission level of said retransmitted one of the upstream or downstream optical transmission signals which is output by said optical signal transmission unit when the first detection signal is generated, to a level which is substantially harmless to the human eye, by reducing the transmission level of the main signal while maintaining the transmission level of at least a portion of the supervisory signal.

* * * * *